No. 891,092. PATENTED JUNE 16, 1908.
J. D. McINTOSH.
BALL BEARING VEHICLE AXLE.
APPLICATION FILED MAR. 12, 1907.
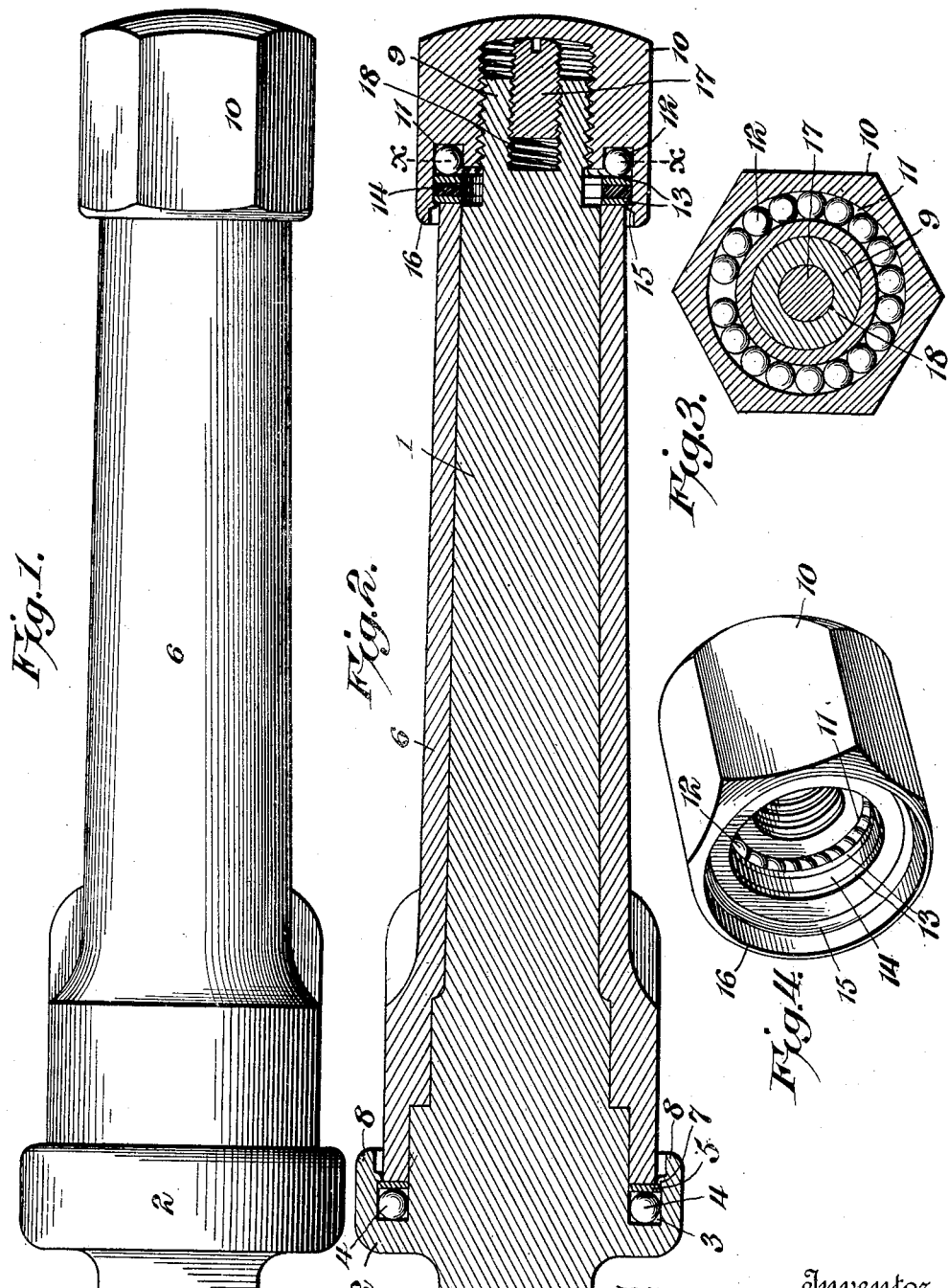

UNITED STATES PATENT OFFICE.

JOHN D. McINTOSH, OF ALEXANDRIA, ONTARIO, CANADA.

BALL-BEARING VEHICLE-AXLE.

No. 891,092.  Specification of Letters Patent.  Patented June 16, 1908.

Application filed March 12, 1907. Serial No. 362,047.

*To all whom it may concern:*

Be it known that I, JOHN D. MCINTOSH, a subject of the King of Great Britain, residing at Alexandria, in the Province of Ontario and Dominion of Canada, have invented a new and useful Ball-Bearing Vehicle-Axle, of which the following is a specification.

The invention relates to improvements in ball bearing vehicle axles.

The object of the present invention is to improve the construction of ball bearing vehicle axles, and to eliminate the friction resulting from the end thrust of the axle box and the spindle.

A further object of the invention is to provide a rotary ball bearing washer for each end of the axle box, adapted to reduce the friction to a minimun and to exclude dust from the bearings.

It is also the object of the invention to provide projecting sand guards or bands for protecting the bearings.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is an elevation of one end of a ball bearing vehicle axle, constructed in accordance with this invention. Fig. 2 is a longitudinal sectional view of the same. Fig. 3 is a transverse sectional view on the line $x$—$x$ of Fig. 2. Fig. 4 is a perspective view of the axle nut.

Like numerals of reference designate corresponding parts in all the figures of the drawing.

1 designates an axle spindle, provided at its inner end with an integral collar 2 having an annular ball bearing groove 3 to form an inner ball cup, in which anti-friction balls 4 are retained by a rotary ball bearing washer 5. The rotary ball bearing washer 5 receives the inner end of the axle box 6, and eliminates or reduces to a minimum the friction resulting from the end thrust of the axle box and the spindle. The ball bearing washer 5, which is adapted to confine the balls within the groove 3, also operates to exclude dust from the bearing, and it is retained in place by an inwardly projecting annular rib 7 formed by bending or up-setting the inner face of the outer wall of the groove after the balls and the washers have been placed in position. The outer wall of the groove is extended to form a projecting sand band or guard 8, which extends into the hub of the wheel and assists in excluding dust from the inner bearing.

The outer end 9 of the spindle is reduced and receives an axle nut 10, which is closed at its outer end and which is provided at its inner end with an annular ball-receiving groove 11 to form a ball cup for the reception of anti-friction balls 12. The outer wall of the groove 11 projects inwardly along the axle box beyond the inner wall of the groove, and a plurality of washers 13 and 14 are interposed between the outer end of the axle box and the anti-friction balls. The washers 13 are preferably constructed of steel, and the washer 14, which is arranged between the washers 13, is designed to be constructed of rubber, leather, or other relatively yieldable material. The washers are retained within the cup of the axle nut by means of an annular rib 15, projecting from the outer wall of the groove and formed by bending or up-setting the said outer wall after the balls and the washers have been placed in position. The outer wall of the groove of the axle nut projects beyond the washers to form a sand band or guard 16, which assists in excluding dust from the bearings.

The ribs 7 and 15, which extend from the outer walls of the grooves 3 and 11 to the outer face of the axle box, assist in excluding dust and dirt from the bearings as well as serving to retain the washers within the ball cups.

The inward movement of the axle nut on the threaded end of the spindle is limited by means of an adjusting screw 17, mounted in a threaded socket 18 of the reduced end of the spindle and projecting therefrom to form an abutment for the nut. The screw 17 is adapted to be adjusted to permit the axle nut to take up the wear of the parts, or any looseness resulting from the compression of the elastic or yieldable washer 14.

Having thus fully described my invention, what I claim as new and desire to secure by Letters Patent, is:—

1. In a device of the class described, the combination with an axle box, of a coöperating ball cup, anti-friction balls arranged within the cup, and a rotary washer interposed between the balls and the axle box, said cup being provided at one of its walls with an integral inwardly projecting portion extending from such wall towards and terminating close to the axle box and engaging the washer for retaining the balls in the cup.

2. In a device of the class described, the combination with an axle box, of a coöperating ball cup, anti-friction balls arranged within the cup, and a rotary washer interposed between the balls and the axle box, said cup being provided at the inner face of its outer wall with an integral annular rib engaging the washer at the periphery thereof for retaining the same and the balls within the cup and extending from the outer wall of the ball cup toward and terminating close to the axle box.

3. In a device of the class described, the combination of a spindle provided at its inner end with a collar having an annular groove, said collar being provided at the inner face of its outer wall with an annular rib, the outer portion of the outer wall beyond the rib forming a sand band or guard, anti-friction balls arranged within the groove, a rotary washer engaging the balls and retained in place by the said rib, and an axle box engaging the washer and fitting within the annular rib, the latter being extended from the outer wall of the groove toward the axle box and terminating close to the same.

4. In a device of the class described, the combination of a nut provided with an annular groove, which is located at an intermediate point between the threaded opening of the nut and the outer face of the latter and having the outer wall thereof extended beyond the inner wall, anti-friction balls arranged within the groove, a washer located beyond the inner wall of the groove of the nut and extending within the extended portion of the outer wall of the same and engaging the balls, there being a rib projecting from the outer wall at an intermediate point for retaining the washer in place, the outer portion of the outer wall beyond the rib forming a dust band or guard.

5. In a device of the class described, the combination of a nut provided at an intermediate point between its threaded opening and its outer face with an annular groove and having the outer wall thereof extended beyond the inner wall, anti-friction balls arranged within the groove, spaced metallic washers located within the extended portion of the outer wall of the groove, and a relatively yieldable washer arranged between and spacing the said washers.

6. In a device of the class described, the combination of a spindle provided at its inner end with a collar having an annular groove and extended beyond the groove to form a sand band or guard, an axle nut provided with an annular groove located at an intermediate point between the threaded opening of the nut and the outer face of the latter and having the outer wall thereof extended beyond the inner wall, anti-friction balls arranged within the grooves of the collar and the nut, washers also located within the collar and the nut and retaining the balls in the grooves, an axle box arranged on the spindle and extending into the collar and the nut and fitting against the washers thereof, and means for engaging the washers to retain the same in place when the axle box is removed.

In testimony, that I claim the foregoing as my own, I have hereto affixed my signature in the presence of two witnesses.

JOHN D. McINTOSH.

Witnesses:
 ALEX L. SMITH,
 ROSABELLE SMITH